(12) United States Patent
Agrawal et al.

(10) Patent No.: US 9,058,301 B2
(45) Date of Patent: Jun. 16, 2015

(54) EFFICIENT TRANSFER OF MATRICES FOR MATRIX BASED OPERATIONS

(75) Inventors: Prashant Agrawal, Orissa (IN); Yogish Sabharwal, Haryana (IN); Vaibhav Saxena, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1077 days.

(21) Appl. No.: 12/485,365

(22) Filed: Jun. 16, 2009

(65) Prior Publication Data

US 2010/0318758 A1    Dec. 16, 2010

(51) Int. Cl.
*G06F 12/00* (2006.01)
*G06F 13/00* (2006.01)
*G06F 13/28* (2006.01)
*G06F 17/16* (2006.01)
*G06F 7/76* (2006.01)

(52) U.S. Cl.
CPC ............... *G06F 17/16* (2013.01); *G06F 7/768* (2013.01)

(58) Field of Classification Search
CPC ...................................................... G06F 17/16
USPC .................................. 711/170, 118, E12.002
See application file for complete search history.

(56) References Cited

U.S. PATENT DOCUMENTS

| | | | |
|---|---|---|---|
| 5,133,061 A * | 7/1992 | Melton et al. ................. | 711/128 |
| 5,479,525 A * | 12/1995 | Nakamura et al. ............ | 382/297 |
| 6,931,511 B1 | 8/2005 | Weybrew et al. | |
| 7,398,484 B2 | 7/2008 | Ruf | |
| 2003/0088600 A1 * | 5/2003 | Lao et al. ....................... | 708/520 |
| 2005/0071409 A1 * | 3/2005 | Gustavson et al. ............ | 708/514 |
| 2008/0313441 A1 * | 12/2008 | Gustavson et al. ............ | 712/225 |
| 2009/0063529 A1 * | 3/2009 | Gustavson et al. ............ | 707/101 |
| 2009/0063607 A1 * | 3/2009 | Gustavson et al. ............ | 708/520 |
| 2011/0055655 A1 * | 3/2011 | Hocevar ........................ | 714/752 |

OTHER PUBLICATIONS

D'Azevedo et al. Vectorized Sparse Matrix Multiply for Compressed Row Storage Format.
Basic Linear Algebra Subroutine Technical (BLAST) Forum, BLAST Forum Standard, http://www.netlib.org/blas/blast-forum/, Aug. 2001.
Anderson et al. "LAPACK Users' Guide (3rd Ed.)", http://www.netlib.org/lapack/lug/index.html (1999).
IBM Corporation. Cell Broadband Engine Programming Handbook v 1.1 (2007).
Hennessy et al. "Computer Architecture: A Quantitative Approach (Third Edition)", p. 105-107, Morgan Kaufmann Publishers, San Francisco, CA, USA (2003).
Basic Linear Algebra Subprograms: A Quick Reference Guide, http://www.netlib.org/blas, May 1997.
Cell SDK 3.1: http://www.ibm.com/developerworks/power/cell/documents.html?S_TACT=105AGX16&S_CMP=LP.

\* cited by examiner

*Primary Examiner* — Sheng-Jen Tsai
(74) *Attorney, Agent, or Firm* — Ryan, Mason & Lewis, LLP

(57) ABSTRACT

Techniques for transferring a matrix for performing one or more operations are provided. The techniques include applying a permutation on at least one of one or more columns and one or more rows of a matrix to group each of at least one of one or more columns and one or more rows of the matrix with a same alignment, blocking at least one of the grouped columns and grouped rows, and performing one or more operations on each matrix block.

20 Claims, 4 Drawing Sheets

EFFICIENT TRANSFER OF MATRICES FOR MATRIX BASED OPERATIONS

FIELD OF THE INVENTION

Embodiments of the invention generally relate to information technology, and, more particularly, to matrix transfers.

BACKGROUND OF THE INVENTION

Numerical linear algebra is fundamental to scientific computing, financial engineering, image and signal processing, data mining, bioinformatics, and many other applications. The performance critical portions of such scientific and other computationally intensive applications can include a set of fundamental linear algebra operations involving vectors and matrices. These operations can be either memory bandwidth-bound or computation-bound depending on the number of memory operations performed as compared to number of arithmetic operations. A general principle of designing parallel linear algebra algorithms is the divide-and-conquer principle where the matrices are divided into sub-matrices and sequential algorithms process these sub-matrices in parallel, which can be termed blocking.

The size of the blocks of the vectors and matrices is decided based on several factors such as the memory hierarchy architecture, size of memory at each level of the hierarchy, number of vectors/matrices, etc. Usually the blocks are small as compared to the vector/matrix dimensions. As a result, in the case of matrices, the adjacent columns/rows of a block are non-contiguous in the memory. As the columns/rows of a matrix block are not contiguous in the memory, multiple memory accesses would be required to fetch them. Moreover, the starting addresses of the columns/rows of the block may not have the same memory alignment. Thus, efficiency of the memory accesses would depend on the alignment of the starting addresses and size of the columns/rows in the blocks.

Modern processors have hierarchical memory architecture (that is, main memory, cache (or scratchpad memory) and registers). The access time to read/write data decreases from main memory to the registers whereas the size of the available memory increases in the reverse order. The data transfers between different levels of memory take place at aligned address boundaries only. Unaligned memory accesses are broken up by the processor and turned into one or more aligned accesses. As a result, unaligned memory access can lead to significant drop in performance due to wastage of memory bandwidth and inefficient memory utilization.

For example, in the case of cache based processors, data is fetched into the caches from the main memory before processing them, and the data is written out from the caches to the main memory. While reading, the data is always read from cache line aligned addresses. If size of the data being read is less than the cache line size, then a single cache line is fetched irrespective of whether the access is aligned or unaligned. However, if the size of the data crosses the cache line boundary and the access is unaligned, then two cache lines have to be fetched and it uses the space of two cache lines in the cache.

In the case of write memory accesses, the processors loads the cache line into the caches, updates the required data and then writes it back at an appropriate time. Thus, similar issues will be encountered during write accesses as in read accesses in case of unaligned data. As such, unaligned memory accesses not only lead to slower memory accesses (total time required for accessing the required data is equal to the transfer time of two cache lines instead of one) but also poor memory utilization (memory space of two cache lines is used for storing the required data).

By way of example, in the case of direct memory access (DMA) based processors such as Cell BE, DMA transfers are used to move data between the local and main memory. Memory alignment is a critical factor that can impact DMA performance. DMA performance is optimal when both source and destination buffers are 128-byte (one cache line) aligned and the size of the transfer is a multiple of 128 bytes. This involves transfer of full cache lines between main memory and local store. If the source and destination are not 128-byte aligned, then DMA performance is optimal when both have the same quadword offset within a cache line. Transfer of unaligned data may result in the use of DMA lists. Also, DMA performance of unaligned data can be poor compared to aligned data due to loss in memory bandwidth and the overhead in creating and usage of DMA lists.

Existing blocking techniques lead to significant wastage of memory bandwidth as well as resources in case the matrices are unaligned, thereby disadvantageously impacting the overall performance of memory bandwidth-bound linear algebra operations. For example, in existing blocking approaches, where the adjacent columns/rows of a matrix block are non-contiguous in the memory, if memory alignment is not taken into consideration, it will lead to each column/row in a block becoming unaligned if the matrix is unaligned. As unaligned memory accesses are highly inefficient, the memory access performance for such matrices is poor. Also, in most of the applications, it is difficult to enforce the memory alignment restrictions on the input/output matrices. As such, it would be desirable to perform the linear algebra operations in a manner such that the memory transfers of the matrices is done efficiently even for the unaligned case.

SUMMARY OF THE INVENTION

Principles and embodiments of the invention provide techniques for efficient transfer of matrices for performing matrix based operations. An exemplary method (which may be computer-implemented) for transferring a matrix for performing one or more operations, according to one aspect of the invention, can include steps of applying a permutation on at least one of one or more columns and one or more rows of a matrix to group each of at least one of one or more columns and one or more rows of the matrix with a same alignment, blocking at least one of the grouped columns and grouped rows, and performing one or more operations on each matrix block.

One or more embodiments of the invention or elements thereof can be implemented in the form of a computer product including a tangible computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
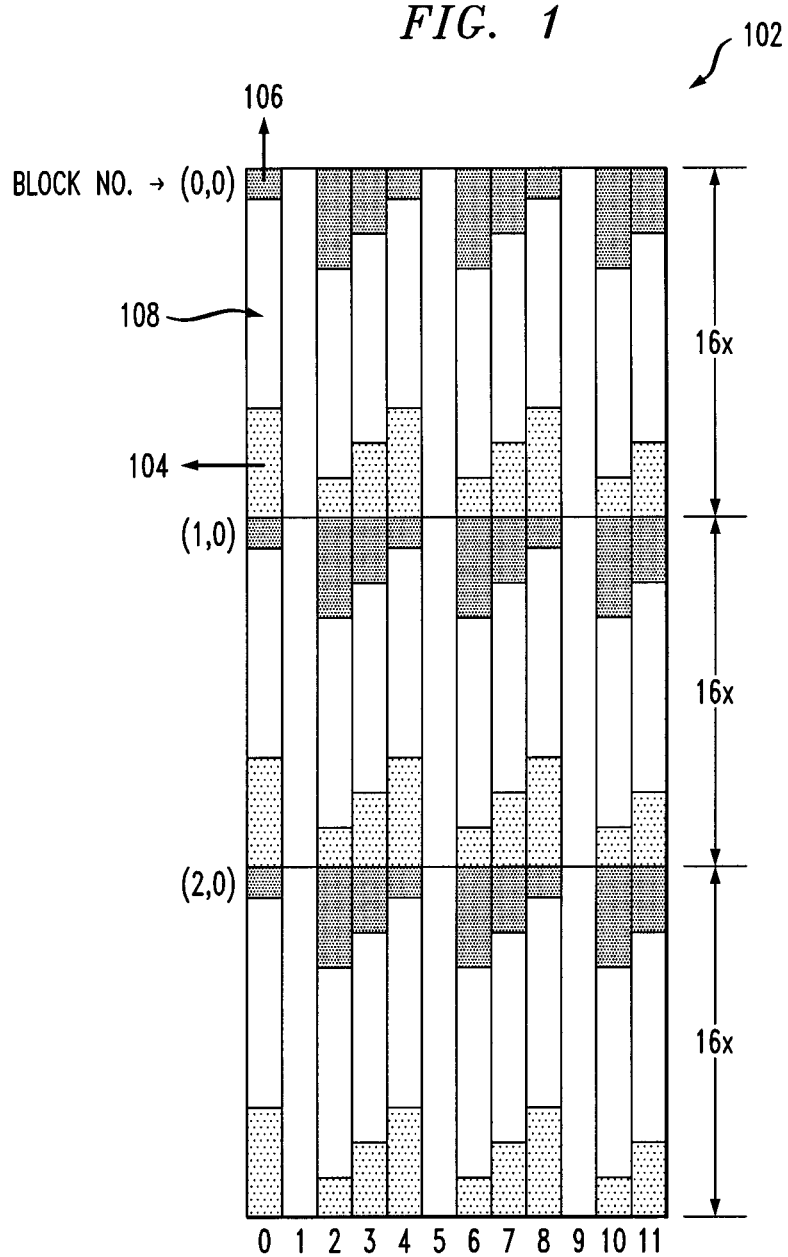
FIG. 1 is a diagram illustrating a matrix partitioned into blocks of p×q elements, where both p and q are multiples of 16, according to an existing approach.

Principles of the invention include efficient transfer of matrices for performing matrix based (for example, linear algebra) operations by improving memory access performance of unaligned regular matrices. The techniques described herein include efficient transfer and storage of matrices to and from the main memory for matrix based operations, irrespective of their alignment and dimensions. As detailed herein, one or more embodiments of the invention include matrix blocking by permuting rows or columns of the matrix based on the mutual alignment (offset) of the starting memory addresses of the matrix rows or columns for performing matrix based operations in an efficient manner.

In one or more embodiments of the invention, the columns and rows of a matrix stored in column/row major ordering are permuted to group its columns and rows with the same alignment. The matrix blocks and other dependant data can be fetched, processed and stored in the permuted order. This enables the blocks of the matrix to remain aligned and their dimensions to remain proper such that optimal memory access performance for the entire matrix is ensured. Additionally, one or more embodiments of the invention are applicable to both cache-based and direct memory access-(DMA-)based processors.

Many linear algebra operations on matrices can be performed by permuting the columns/rows of the original matrix or elements of the vector (matrix of dimension Mx1) and suitably permuting the obtained results, if required. Consider the following example of matrix-vector multiplication where x and y are vectors and A is a matrix. The operation performed in Eq. (1), by way of example, is a case which performs $y = \alpha \cdot op(A) \cdot x + \beta \cdot y$, where $\alpha$ and $\beta$ are scalar constants, and $op(A) = A$ or $A^T$.

$$y = A^T x \quad (1)$$

$$\begin{bmatrix} y_1 \\ y_2 \\ y_3 \\ y_4 \end{bmatrix} = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix}^T \begin{bmatrix} x_1 \\ x_2 \\ x_3 \\ x_4 \end{bmatrix} \quad (2)$$

Here, $y_i = \sum_k a_{ki} \cdot x_k \quad (3)$

The same computation can be carried out, for example, by permuting the columns of A and then suitably permuting the elements of the resultant vector, as shown below.

Step 1: Permuting columns of matrix A (that is, interchanging the $2^{nd}$ and $3^{rd}$ columns).

$$\begin{bmatrix} r_1 \\ r_2 \\ r_3 \\ r_4 \end{bmatrix} = \begin{bmatrix} a_{11} & a_{13} & a_{12} & a_{14} \\ a_{21} & a_{23} & a_{22} & a_{24} \\ a_{31} & a_{33} & a_{32} & a_{34} \\ a_{41} & a_{43} & a_{42} & a_{44} \end{bmatrix}^T \begin{bmatrix} x_1 \\ x_2 \\ x_3 \\ x_4 \end{bmatrix} \quad (4)$$

Step 2: Permuting the resultant vector r (that is, interchanging the $2^{nd}$ and $3^{rd}$ elements).

$$\begin{bmatrix} y_1 \\ y_2 \\ y_3 \\ y_4 \end{bmatrix} = \begin{bmatrix} r_1 \\ r_3 \\ r_2 \\ r_4 \end{bmatrix} \quad (5)$$

Consider another example of vector outer product where x and y are vectors and A is a matrix. The operation performed in Eq. (6), by way of example, is a case which performs $A = \alpha \cdot x \cdot y^T + A$, where $\alpha$ is a scalar constant.

$$A = xy^T \quad (6)$$

$$\begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix} = \begin{bmatrix} x_1 \\ x_2 \\ x_3 \\ x_4 \end{bmatrix} \begin{bmatrix} y_1 \\ y_2 \\ y_3 \\ y_4 \end{bmatrix}^T \quad (7)$$

Here, $a_{ij} = x_i \cdot y_j^T \quad (8)$

This computation can also be carried out, for example, by permuting the elements of y and suitably permuting the elements of the resultant matrix, as shown below.

Step 1: Permuting the elements of vector y (that is, interchanging the $2^{nd}$ and $3^{rd}$ elements).

$$\begin{bmatrix} r_{11} & r_{12} & r_{13} & r_{14} \\ r_{21} & r_{22} & r_{23} & r_{24} \\ r_{31} & r_{32} & r_{33} & r_{34} \\ r_{41} & r_{42} & r_{43} & r_{44} \end{bmatrix} = \begin{bmatrix} x_1 \\ x_2 \\ x_3 \\ x_4 \end{bmatrix} \begin{bmatrix} y_1 \\ y_2 \\ y_3 \\ y_4 \end{bmatrix}^T \quad (9)$$

Step 2: Permuting the resultant matrix R (that is, interchanging the $2^{nd}$ and $3^{rd}$ columns).

$$\begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix} = \begin{bmatrix} r_{11} & r_{13} & r_{12} & r_{14} \\ r_{21} & r_{23} & r_{22} & r_{24} \\ r_{31} & r_{33} & r_{32} & r_{34} \\ r_{41} & r_{43} & r_{42} & r_{44} \end{bmatrix} \quad (10)$$

As described herein, one or more embodiments of the invention optimize the memory access performance of the matrices by permuting their columns (or rows) if the matrix is stored in column-major (or row-major) order such that the columns (or rows) with the same memory address offset with respect to the cache line boundary (or, for example, 128-byte in case of Cell processor) are grouped together. A group of columns (or rows) having the same starting addresses offset can be referred to herein as a columnset (or rowset). These columnsets (or rowsets) can be further divided into blocks using a suitable blocking factor for that set. The starting addresses of such blocks are aligned and their size is a multiple of the cache line size (or 128-byte in case of Cell processor).

In one or more embodiments of the invention, the first and the last block for a columnset and/or rowset may not be aligned and the size may not be a multiple of the cache line size (or 128-bytes). However, in such an embodiment, this will have minimal impact on the performance as all other blocks in each columnset (or rowset) of the matrix are guaranteed to be aligned and their size to be a multiple of the cache line size (or 128-bytes). Consequently, the benefit of the grouping detailed herein is that the memory access performance of all the blocks (except, for example, possibly the first and the last blocks) in each columnset (or rowset) will be efficient.

For example, for a DMA based processor (such as, for example, Cell BE), consider a matrix of double precision elements (the size of each element is 8 bytes) stored in column-major order. In this example, the starting address of the matrix is at 128-bytes offset of 96 bytes, its leading dimension is 2116 elements, and its column-size is 2000 elements. Table 1 shows the 128-bytes offsets for the first 12 columns of the matrix. Also, in Table 1, the "Head Elements" column indicates the number of elements from the start of the column following which the element will be at a 128-byte aligned address. Also, the "Tail Elements" column indicates the number of elements left at the end of a column after considering elements in multiples of 16 (that is, 128 bytes) in the column.

TABLE 1

| Col No. | 128-bytes Offset | Head Elements | Tail Elements |
|---|---|---|---|
| 0 | 96 | 4 | 12 |
| 1 | 0 | 0 | 0 |
| 2 | 32 | 12 | 4 |
| 3 | 64 | 8 | 8 |
| 4 | 96 | 4 | 12 |
| 5 | 0 | 0 | 0 |
| 6 | 32 | 12 | 4 |
| 7 | 64 | 8 | 8 |
| 8 | 96 | 4 | 12 |
| 9 | 0 | 0 | 0 |
| 10 | 32 | 12 | 4 |
| 11 | 64 | 8 | 8 |

From Table 1, one can observe that the 128-bytes offset of every fifth column is the same. Additionally, one can also see that for columns 0, 4, 8, etc., the fifth element is at a 128-byte aligned address. Similarly, for columns 1, 5, 9, etc., the first element, for columns 2, 6, 10, etc., the $13^{th}$ element, and for columns 3, 7, 11, etc., the ninth element is at a 128-byte aligned address.

FIG. 1 is a diagram illustrating a matrix 102 partitioned into blocks of p×q elements, where both p and q are multiples of 16, according to an existing approach. By way of illustration and in conjunction with Table 1 above, FIG. 1 depicts tail elements 104, head elements 106 and a 128-byte aligned element 108. The partitioned matrix 102 depicted in FIG. 1 leads to creation of head and tail elements in each column in a block depending on the alignment of the starting address of the column.

In FIG. 1, the elements in darker gray shading (for example, element 106) depict head elements and the elements in lighter gray shading (for example, element 104) depict tail elements, whereas the elements in white represent that portion of the column which is 128-byte aligned and its dimension is a multiple of 128-bytes (for example, element 108). Transfer of a block will require usage of DMA lists (multiple DMA transfers packed into a single DMA request primarily used for performing scatter/gather operations), as its columns are not contiguous in the memory. The columns having head and tail elements will require multiple list elements, unlike the columns having no head and tail element which will require a single list element only. Additionally, the list elements used for the head and tail elements in FIG. 1 will result in multiple DMAs, each transferring less than 128 bytes of data and thus leading to wastage of memory bandwidth.

Figure 2:
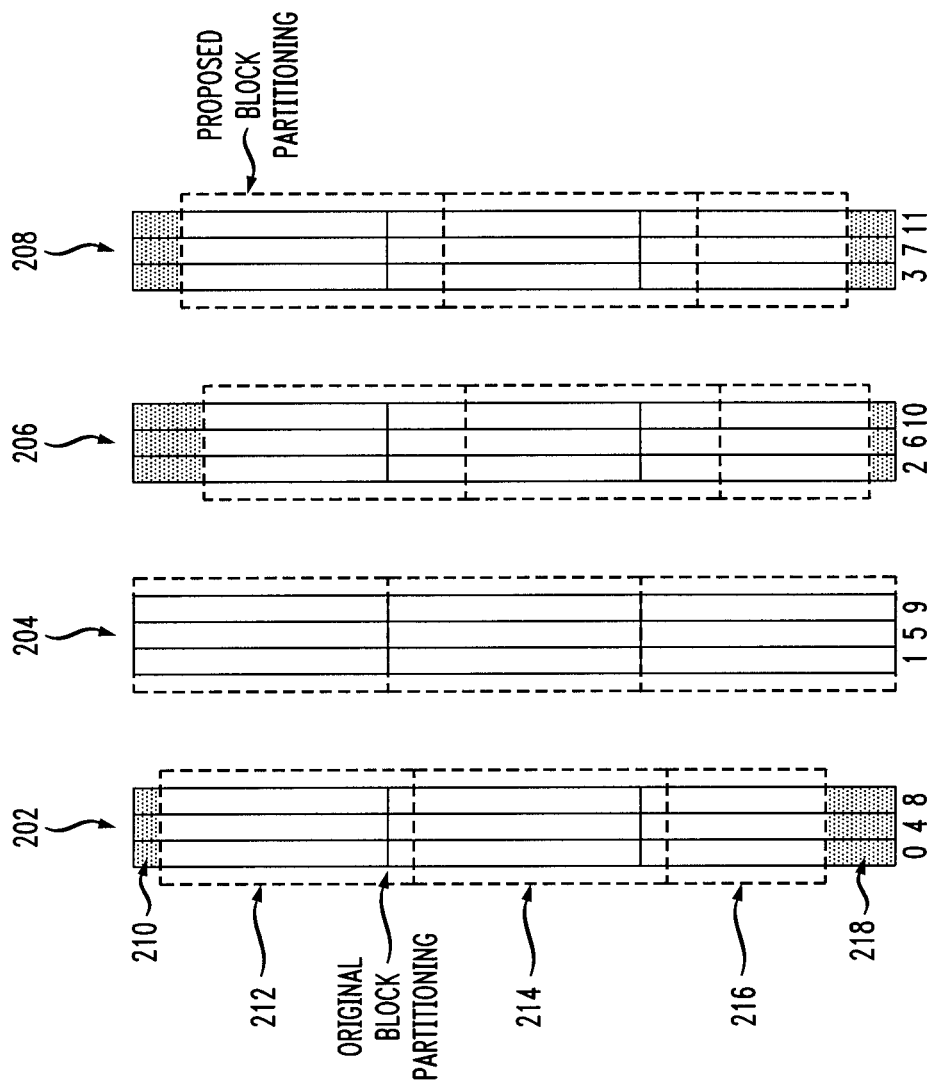
FIG. 2 is a diagram illustrating permutation and blocking of a matrix, according to an embodiment of the present invention.

FIG. 2 is a diagram illustrating permutation and blocking of a matrix, according to an embodiment of the present invention. By way of illustration, FIG. 2 depicts columnset 202, columnset 204, columnset 206 and columnset 208 obtained by permuting and grouping the columns with the same offset. For instance, columnset 202 is obtained by permuting and grouping columns 0, 4 and 8. FIG. 2 also depicts partitioning of the columnsets into blocks. For example, columnset 202 is partitioned into blocks 210, 212, 214, 216 and 218.

In one or more embodiments of the invention, and as depicted in FIG. 2, the columns of matrices are permuted such that columns with the same 128-byte offset of their starting addresses are grouped together. As such, every fifth column of the matrix will be grouped together, as shown in FIG. 2. These columnsets are partitioned into blocks of p×q elements, leaving out the head and tail elements. The characteristics of these blocks are that the starting addresses of all their columns are 128-byte aligned and their size is a multiple of 128 bytes.

Transfer of a block will utilize the usage of DMA lists; however, unlike existing approach blocking, in one or more embodiments of the invention, each column of the block will require only one list element and the DMA transfer of the block can be carried out efficiently. Additionally, the head and tail elements can be processed separately. Also, in one or more embodiments of the invention, one can limit the creation of the head and tail elements to once for each columnset, unlike existing blocking approaches where head and tail elements were getting created once for each block in the columnsets. Consequently, the impact of memory bandwidth wastage due to head and tail element will be minimal in the case of the techniques detailed herein.

Figure 3:
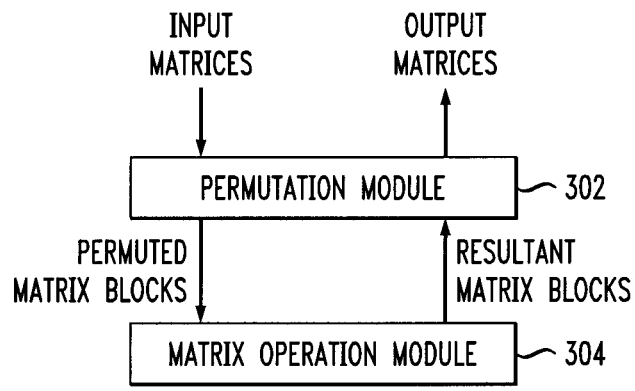
FIG. 3 is a block diagram illustrating an exemplary embodiment, according to an aspect of the invention.

FIG. 3 is a block diagram illustrating an exemplary embodiment, according to an aspect of the invention. FIG. 3 depicts permutation module 302 and matrix operation module 304. Permutation module 302 determines the permutation of one or more columns and/or one or more rows of the matrix to group each of one or more columns and/or one or more rows of the matrix with the same alignment and blocks the grouped columns or rows. These blocks are specified to the matrix operation module 304 which performs one or more matrix based operations on them. The resultant blocks from 304 are specified to 302 which stores the resultant matrix based on the permutation determined earlier. Further, in one or more embodiments of the invention, at least one of the matrices involved in operations is of dimension M×N, where both M and N are at least 2.

Figure 4:
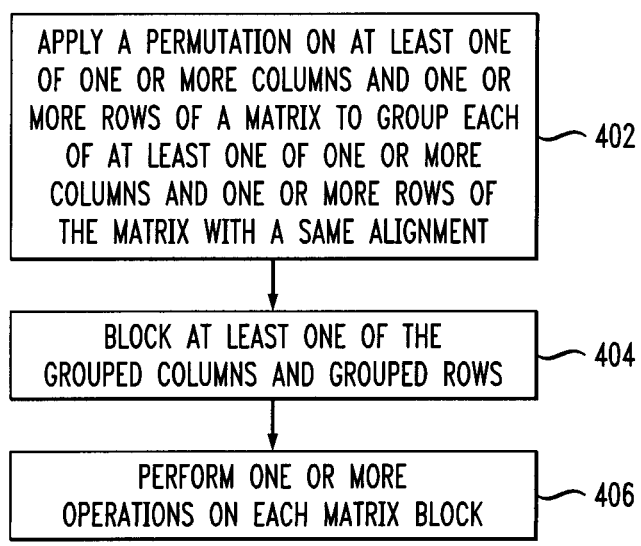
FIG. 4 is a flow diagram illustrating techniques for transferring a matrix for performing one or more operations, according to an embodiment of the invention.

FIG. 4 is a flow diagram illustrating techniques for transferring a matrix for performing one or more operations (for example, matrix based operations and/or linear algebra operations), according to an embodiment of the present invention. The techniques depicted in FIG. 4 are applicable to a cache-based processor (for example, x86 processors) as well as to a direct memory access-based processor (for example, Cell BE, which uses DMA to transfer data from/to the main memory).

Step 402 includes applying a permutation on at least one of one or more columns and one or more rows of a matrix to group each of at least one of one or more columns and one or more rows of the matrix with a same alignment. Applying a permutation on columns and/or rows of the matrix can include applying a permutation on columns and/or rows of the matrix for a matrix stored in column/row major ordering.

Step 404 includes blocking at least one of the grouped columns and grouped rows. One or more embodiments of the invention additionally include enabling each block of the matrix to remain aligned and to maintain proper dimensions such that optimal memory access performance for the matrix is ensured. Step 406 includes performing one or more operations on each matrix block.

Also, one or more embodiments of the invention include permuting back the resultant blocks if required, as well as storing back the resultant matrix.

The techniques depicted in FIG. 4 can also include fetching blocks of the matrix in permuted order from a main memory as well as fetching dependant data in permuted order from a main memory. In one or more embodiments of the invention, dependent data can include vectors (matrices of dimension Mx1) involved in the operations. Additionally, one or more embodiments of the invention include storing one or more blocks of the matrix in permuted order to a main memory as well as storing dependent data in permuted order to a main memory.

Further, the techniques depicted in FIG. 4 include enabling optimal memory bandwidth usage irrespective of alignment and size of the matrix as well as enabling optimal memory resource usage irrespective of alignment and size of the matrix.

The techniques depicted in FIG. 4 can also, as described herein, be run on a system, wherein the system includes distinct software modules, each of the distinct software modules being embodied on a tangible computer-readable recordable storage medium. The distinct software modules can include, for example, a permutation module and a matrix operation module executing on a hardware processor.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 5:
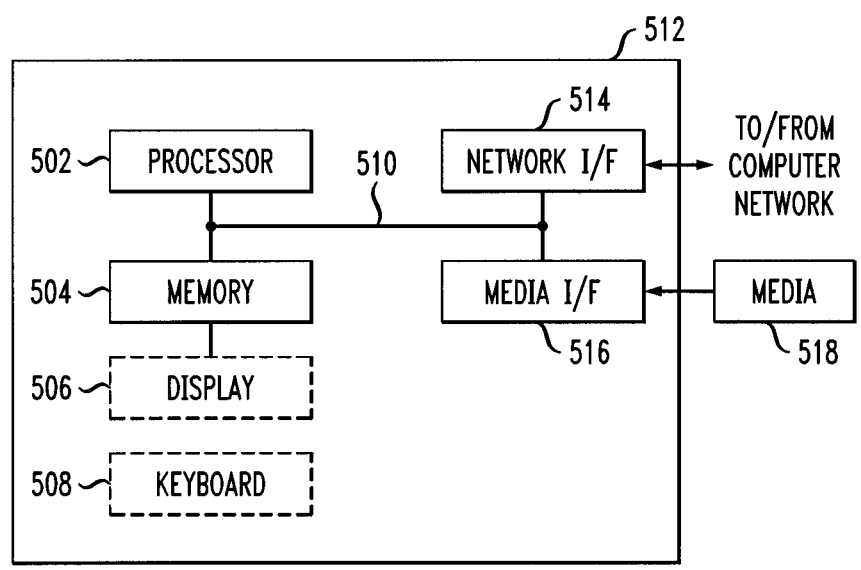
FIG. 5 is a system diagram of an exemplary computer system on which at least one embodiment of the invention can be implemented.

One or more embodiments can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

Furthermore, the invention can take the form of a computer program product accessible from a computer-usable or computer-readable medium (for example, media 518) providing program code for use by or in connection with a computer or any instruction implementation system. For the purposes of this description, a computer usable or computer readable medium can be any apparatus for use by or in connection with the instruction implementation system, apparatus, or device. The medium can store program code to implement one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 504), magnetic tape, a removable computer diskette (for example media 518), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or implementing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. One or more embodiments of the invention can run on a single computer, which can be, for example, multi-core processor-based. One or more distinct software modules (as detailed herein) can, for example, execute on different processor cores of the computer.

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium; the modules can include any or all of the components shown in FIG. 3. The method steps can then be carried out using the distinct software modules and/or sub-modules of the system, as described above, implementing on a hardware processor. Further, a computer program product can include a tangible computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, performing operations on permuted rows and/or columns of matrices for efficient matrix blocking based on the offsets of the matrix rows or columns.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for transferring a matrix for performing one or more operations, wherein the method comprises:

applying a permutation on three or more columns and/or three or more rows of a matrix stored in column and/or row major ordering to associate the three or more columns and/or the three or more rows of the matrix with a same alignment of a starting memory address, wherein said applying is carried out by a permutation module executing on a hardware processor;

blocking two or more non-consecutive columns and/or two or more non-consecutive rows from the associated three or more columns and/or the associated three or more rows into at least one matrix block of non-contiguous data, wherein the starting memory address of each matrix block is aligned and the size of each matrix block is a multiple of a cache line size, and wherein said blocking is carried out by a permutation module executing on a hardware processor; and performing one or more operations on each matrix block, wherein said performing is carried out by a matrix operation module.

2. The method of claim 1, wherein the one or more operations can include at least one of one or more matrix based operations and one or more linear algebra operations.

3. The method of claim 1, further comprising enabling each block of the matrix to remain aligned and to maintain proper dimensions such that memory access performance for the matrix is improved.

4. The method of claim 1, wherein the method is applicable to a cache-based processor.

5. The method of claim 1, wherein the method is applicable to a direct memory access-based processor.

6. The method of claim 1, further comprising fetching one or more blocks of the matrix in permuted order from a main memory.

7. The method of claim 1, further comprising fetching dependant data in permuted order from a main memory, wherein the dependant data consists of data other than the matrix.

8. The method of claim 1, further comprising storing one or more blocks of the matrix in permuted order to a main memory.

9. The method of claim 1, further comprising storing dependant data in permuted order to a main memory.

10. The method of claim 1, further comprising improving memory bandwidth usage irrespective of alignment and size of the matrix.

11. The method of claim 1, further comprising improving memory resource usage irrespective of alignment and size of the matrix.

12. The method of claim 1, wherein the method is run on a system, wherein the system comprises one or more distinct software modules, each of the one or more distinct software modules being embodied on a tangible computer-readable recordable storage medium, and wherein the one or more distinct software modules comprise a permutation module and a matrix operation module executing on a hardware processor.

13. A computer program product comprising a tangible computer readable recordable storage medium including computer useable program code for transferring a matrix for performing one or more operations, the computer program product including:

computer useable program code for applying a permutation on three or more columns and/or three or more rows of a matrix stored in column and/or row major ordering to associate the three or more columns and/or the three or more rows of the matrix with a same alignment of a starting memory address;

computer useable program code for blocking two or more non-consecutive columns and/or two or more non-consecutive rows from the associated three or more columns and/or the associated three or more rows into at least one matrix block of non-contiguous data, wherein the starting memory address of each matrix block is aligned and the size of each matrix block is a multiple of a cache line size; and computer useable program code for performing one or more operations on each matrix block.

14. The computer program product of claim 13, further comprising:

computer useable program code for enabling each block of the matrix to remain aligned and to maintain proper dimensions such that memory access performance for the matrix is improved.

15. The computer program product of claim 13, further comprising:

computer useable program code for fetching one or more blocks of the matrix in permuted order from a main memory; and computer useable program code for storing one or more blocks of the matrix in permuted order to a main memory.

16. The computer program product of claim 13, wherein the computer usable program code comprises one or more distinct software modules, and wherein the one or more distinct software modules comprise a permutation module and a matrix operation module executing on a hardware processor.

17. A system for transferring a matrix for performing one or more operations, comprising:

a memory; and at least one processor coupled to the memory and operative to:

apply a permutation on three or more columns and/or three or more rows of a matrix stored in column and/or row major ordering to associate the three or more columns and/or the three or more rows of the matrix with a same alignment of a starting memory address;

block two or more non-consecutive columns and/or two or more non-consecutive rows from the associated three or more columns and/or the associated three or more rows into at least one matrix block of non-contiguous data, wherein the starting memory address of each matrix block is aligned and the size of each matrix block is a multiple of a cache line size; and perform one or more operations on each matrix block.

18. The system of claim 17, wherein the at least one processor coupled to the memory is further operative to:

enable each block of the matrix to remain aligned and to maintain proper dimensions such that memory access performance for the matrix is improved.

19. The system of claim 17, wherein the at least one processor coupled to the memory is further operative to:

fetch one or more blocks of the matrix in permuted order from a main memory; and store one or more blocks of the matrix in permuted order to a main memory.

20. The system of claim 17, further comprising a tangible computer-readable recordable storage medium having one or more distinct software modules embodied thereon, the one or more distinct software modules comprising a permutation module and a matrix operation module.

* * * * *